United States Patent
Euverink et al.

(10) Patent No.: US 6,864,063 B2
(45) Date of Patent: Mar. 8, 2005

(54) USE OF MODIFIED STARCH AS AN AGENT FOR FORMING A THERMOREVERSIBLE GEL

(75) Inventors: Gerrit Jan Willem Euverink, Groningen (NL); Doede Jacob Binnema, Groningen (NL)

(73) Assignee: Cooperatieve Verkoop-en Productievereniging van Aardappelmeel en Derivaten AVEBE B.A., Veendam (NL)

( * ) Notice: Subject to any disclaimer, the term of this patent is extended or adjusted under 35 U.S.C. 154(b) by 0 days.

(21) Appl. No.: 10/115,347

(22) Filed: Apr. 3, 2002

(65) Prior Publication Data

US 2003/0007984 A1 Jan. 9, 2003

Related U.S. Application Data

(63) Continuation of application No. 09/242,641, filed as application No. PCT/NL97/00552 on Oct. 6, 1997, now abandoned.

(30) Foreign Application Priority Data

Oct. 7, 1996 (NL) .............................................. 1004214

(51) Int. Cl.$^7$ ............................ C12Q 1/48; C08B 33/00
(52) U.S. Cl. ........................... 435/15; 435/97; 536/102; 127/32; 127/71
(58) Field of Search ..................... 435/97, 15; 536/102, 536/125; 127/32, 71

(56) References Cited

U.S. PATENT DOCUMENTS

| | | | |
|---|---|---|---|
| 3,455,783 A | 7/1969 | Alburn et al. | 195/29 |
| 3,962,465 A | 6/1976 | Richter et al. | 426/48 |
| 3,986,890 A | 10/1976 | Richter et al. | 127/38 |
| 4,626,288 A | 12/1986 | Trzasko et al. | 106/210 |
| 4,971,723 A | 11/1990 | Chiu | 252/315.3 |
| 5,308,636 A * | 5/1994 | Tye et al. | 426/573 |
| 5,686,132 A | 11/1997 | Takaha et al. | 426/658 |
| 5,747,297 A * | 5/1998 | Clarke et al. | 435/72 |

FOREIGN PATENT DOCUMENTS

| | | | |
|---|---|---|---|
| EP | 0 690 170 A1 | | 1/1996 |
| EP | 0 355 908 | | 2/1999 |
| WO | WO 96/03057 | * | 2/1996 |

* cited by examiner

*Primary Examiner*—James O. Wilson
*Assistant Examiner*—Leigh C. Maier
(74) *Attorney, Agent, or Firm*—Hoffmann & Baron, LLP (57) ABSTRACT

The invention relates to the use of modified starch obtainable by treating amylose containing starch in aqueous medium with an enzyme from the group of the α-1,4-α-1,4-glucosyl transferases (EC 2.4.1.25) or an enzyme the activity of which corresponds to that of enzymes from the group just mentioned, as an agent for forming a thermoreversible gel. The invention also relates to products in the form of a thermoreversible gel having as gel-forming substance a modified starch as defined. The invention further relates to the use of a modified starch as defined in the form of an aqueous solution.

4 Claims, 8 Drawing Sheets

USE OF MODIFIED STARCH AS AN AGENT FOR FORMING A THERMOREVERSIBLE GEL

This application is a application Ser. No. 09/242,641, filed on May 3, 1999, now abandoned which is the U.S. national stage of PCT/Nc9700552, filed Oct. 6, 1997.

The invention relates to the use of a starch modified in a specific way as an agent for forming a thermoreversible gel.

It is known to modify starch in many different ways. Depending on the modification carried out, there are obtained starch products suitable for divergent uses. Many of the known starch modifications lead to obtaining relatively viscous solutions which are therefore difficult to manage. In other cases a low viscosity can indeed be obtained, but then the molecular weight has substantially decreased, so that many typical starch characteristics are lost.

Another problem with products from gelatinized starch is retrogradation in which dissolved amylose molecules become gradually and irreversibly insoluble. A non-retrogradable starch solution can be obtained by using starches in which no amylose is present. To this end, amylopectin and amylose can be separated from any type of starch, but these procedures are laborious. Amylose-free starches may also be recovered from special crops in which no amylose is formed. These crops must then be grown for the purpose. Non-retrograding starches can also be obtained by chemical derivation, but this causes the introduction of foreign groups, which affects the properties of the starch. Finally, retrogradation can also be prevented by increasing the dextrose equivalent (DE) of the starch solution by means of enzymatic hydrolysis, but then the polymeric character of the starch deteriorates and is sometimes lost completely.

It is further known that specific starch derivatives are capable of forming starch gels which offer different possibilities of use, but so far starch gels can only be obtained at rather high concentrations of at least 10%, as is known from Carbohydrate Polymers 231 (1993), 243–248.

It has now been found that a starch modified in a specific manner is eminently suited for forming a thermoreversible gel.

It has further been found that a thus modified starch is already in a low concentration capable of forming a thermoreversible gel.

The modified starch to be used according to the invention is also characterized by a low viscosity in aqueous solution, so that the product is easy to manage and to process and such aqueous solution is suitable for many uses.

It is very remarkable that the modified starch to be used according to the invention is substantially identical with the starting material as regards the average molecular weight, the reducing power (DE) and the branching percentage. The polymeric properties are thus maintained, while, furthermore, there is no increase in oxidation-sensitive places (DE remains practically unchanged).

In accordance with the above-described objects the invention is characterized in that a modified starch obtainable by treating amylose-containing starch in aqueous medium with an enzyme from the group of α-1,4-α-1,4-glucosyl transferases (EC 2.4.1.25) or an enzyme the activity of which corresponds to that of enzymes from the group just mentioned — all these enzymes will be briefly referred to below as glucosyl transferase — is used as an agent for forming a thermoreversible gel. The typical and relevant activity of glucosyl transferases is that they are capable of breaking an α-1,4 bond between two glucose units to subsequently make a novel α-1,4 bond.

The invention is further characterized by the use of modified starch as defined above in the form of an aqueous solution which, as stated, has a relatively low viscosity. As used herein, the term "starch" comprises both native starch and non-substituted starch derivatives. By the latter are meant starches obtained by partially breaking down native starch through acid and/or enzymatic hydrolysis to obtain a DE of not more than 5, because otherwise the polymeric character of the starch is lost. The starch for use in the conversion with glucosyl transferase must, as stated, contain amylose, preferably in an amount of at least 5 wt. %. Besides, the starting starch must also contain amylopectin which, however, is always naturally present in starch. Amylose- and amylopectin-containing native starches, such as potato starch, maize starch, wheat starch, rice starch and tapioca starch, as well as non-substituted derivatives thereof may therefore be used as starting starch.

The glucosyl transferases to be used can be obtained from different organisms. From the literature it is known that these enzymes occur in representatives of the Eukarya and the Bacteria. It is further known that glucosyl transferases are also present in representatives of the Archae. There is preferably used a glucosyl transferase which is resistant to a rather high temperature, e.g. a temperature of about 70° C. Examples thereof are glucosyl transferases from *Thermus thermophilus, Thermotoga maritima* and from thermophilic representatives of the Archae. But also non-thermostable glucosyl transferases from, e.g., the potato or *Escherichia coli*, respectively D-enzyme and amylomaltase, are useful in the performance of the invention. If necessary, the enzyme must be purified of enzymatic components which may cause undesirable damage to or breakdown of the starch molecule. Thus, the enzyme must be essentially free of contaminating α-amylase activity. To those skilled in the art it is known how to carry out such a purification.

The enzymatic conversion with glucosyl transferase can be carried out both with gelatinized starch and with starch that is still in granular form, but then in a swollen state, or, in other words, that is only partially gelatinized. In the former case, the glucosyl transferase can be added to the already gelatinized starch solution, after it has cooled to, e.g., the desired reaction temperature. In the latter case, the glucosyl transferase can be added to the starch suspension at any desirable moment.

The reaction conditions for carrying out the enzymatic conversion depend on the glucosyl transferase used and can be easily determined by those skilled in the art. In practice, this is usually done at or near a pH at which the enzyme has optimum activity. According as more enzyme is used, the conversion proceeds more rapidly and also a higher temperature enhances the contemplated enzymatic conversion. Of course, when the temperature is chosen, the thermal stability of the glucosyl transferase used must be considered. When a rather thermostable enzyme is used, the enzymatic conversion is preferably carried out at a temperature within the range of 60–75° C. The progress of the conversion can be followed by means of the reduction of the viscosity. After the desired viscosity reduction has been reached, the conversion can be broken down. Preferably, however, the conversion is continued until no further viscosity reduction occurs.

After the desired enzymatic conversion has taken place, the enzyme may be deactivated, if desired, by heating the reaction mixture. When there is started from a starch suspension, this may then also be converted to a solution. If desired, the enzyme which may or may not be deactivated can also be separated from the reaction mixture by techniques known to those skilled in the art, such as dialysis. In fact, for specific uses the presence of glucosyl transferase cannot be allowed. If desired, the starch solution obtained may be concentrated or the dry modified starch may be recovered as a powder. Also, washing treatments may be carried out according to need, such as with cold water and with solutions having increasing concentrations of ethanol, after which drying can take place.

An aqueous solution of a starch modified with glucosyl transferase has the property upon cooling to form a gel which, by increasing the temperature, passes again into a solution. This is therefore a thermoreversible gel, and the invention is exactly directed to the use of a modified starch that can be obtained in the manner described, as a thermoreversible gel. This thermoreversible behaviour already occurs at a low concentration of, e.g., about 3 wt. % modified starch, so that when this thermoreversible behaviour according to the invention is utilized, a small amount of the modified starch will already be enough.

As briefly stated above, an aqueous solution of a starch modified with glucosyl transferase has a low viscosity. In fact, an aqueous solution of about 10 wt. % has a substantially lower viscosity than a 10 wt. % solution of non-modified starch. Thus, the product is very easy to process. Furthermore, the average molecular weight, the reducing power (DE) and the branching percentage have remained practically unchanged with respect to the starting material. From this it can be derived that a mutual rearrangement between the different types of starch molecules has taken place without increase in oxidation-sensitive places or parts having reducing activity. Finally, it turns out that little or no retrogradation occurs, so that the product in question is very stable.

A starch modified by enzymatic conversion in the indicated manner is suitable for many uses in which the property to form a thermoreversible gel can be useful or important, such as in foodstuffs, cosmetics, pharmaceutics, detergents, adhesives and drilling fluids. These uses are known per se to those skilled in the art, so that they need not be discussed here in more detail. For these uses the stability of the modified starch and the fact that the contemplated thermoreversible activity can already be obtained at a low concentration of, e.g., only about 3 wt. % are important advantages. Which amount gives optimum activity in a specific case can be easily determined by those skilled in the art by way of experiment.

The invention will be further illustrated by means of the following examples.

EXAMPLE 1

Purification of the Thermostable Glucosyl Transferase from *Thermus thermophilus*

The activity of the glucosyl transferase was determined by determining from maltotriose at 70° C. and pH 6.5 in 50 mM maleate buffer the amount of glucose formed. The activity was expressed in μmol glucose per minute per milligram protein (units per mg).

Step 1. The thermophilic gram-negative eubacterium *Thermus thermophilus* HB8 was cultured in a 40 l fermenter having a working volume of 35 l. The growth medium contained (per liter) 50 g yeast extract; 50 g casamino acids; 10 g sucrose; 2.5 g $(NH_4)_2SO_4$; 0.2 g $MgCl_2$; 6.2 g $K_2HPO_4$; 2.2 g $NaH_2PO_4$. Cultivation was effected at a temperature of 70° C. and the pH was kept at 7.0 with 2 M NaOH. Antifoam was added to reduce foaming. After fermentation the cells were collected by means of crossflow filtration and centrifugation. The cells were frozen at −20° C. Before purification 40 g cells (wet weight) were thawed and 1 mg DNase was added. This was subjected to sonification for 14×20 sec; 9 mm probe, 18 Watt. Between the cycles there was a waiting period of 40 sec. Cell residues were removed by means of centrifugation (60 min; 30,000×g). The supernatant was carefully poured off. The viscous pellet was washed once more with 50 mM Tris-HCl pH 7.5 and centrifuged again. The two supernatants were combined and used as a cell-free extract (140 ml)

Step 2. The cell-free extract was distributed over 10 test tubes and incubated for 5 min at 90° C. Precipitated material was removed by means of centrifugation (15 min; 17,000×g rpm).

Step 3. Material from step 2 was brought onto 30% (saturation) $(NH_4)_2SO_4$ (23.0 g) and incubated for 15 min at 4° C. The precipitated material was removed by means of centrifugation (15 min; 17,000×g) and the supernatant (150 ml) was brought onto 60% (saturation) $(NH_4)_2SO_4$ (27.2 g). After 15 min incubation at 4° C. the pellet obtained by means of centrifugation (15 min; 17,000×g) was dissolved in 25 ml 20 mM Tris-HCl pH 7.5 and dialysed overnight against 1 l of the same buffer.

Step 4: The dialysed material from step 3 (40 ml) was divided into two portions of 20 ml. Each portion was separated individually by means of MonoQ (HR 10/10) (Pharmacia) anion exchange chromatography. Non-binding proteins were washed out of the column, until the $A_{280}$ of the eluent was lower than 0.05. Bound proteins were eluted with a 240 ml gradient of 0 to 0.5 M NaCl in 20 mM Tris-HCl pH 7.5 (4 ml/min; fraction: 4 ml). The fractions of the two separation steps in which the highest glucosyl transferase activity was present were combined.

Step 5: Material from step 4 was dialysed overnight against 1 ml 20 mM Tris-HCl pH 6.8 with 0.25 M NaCl. The material was bound to a chelating Superose HR (10/2) (Pharmacia), charged with copper ions according to the manufacturer's prescription. Non-binding proteins were washed out of the column, until the $A_{280}$ was lower than 0.05. Bound proteins were eluted with a 30 ml gradient of 0 to 3.0 M $NH_4Cl$ in 20 mM Tris-HCl pH 6.8; 0.25 M NaCl (1 ml/min; fraction: 1 ml). The fractions in which the highest glucosyl transferase activity was present were combined.

Step 6: Material from step 5 was brought onto a Superdex 200 HR (26/60) (Pharmacia) gel filtration column and eluted with 20 mM Tris-HCl pH 7.5; 0.1 M NaCl (2.5 ml/min; fraction: 5 ml). The fractions in which the highest glucosyl transferase activity was present were combined.

Step 7: Material from step 6 was brought onto 1.7 M $(NH_4)_2SO_4$ and onto an alkyl Superose HR (5/5) (Pharmacia). Non-binding proteins were washed out of the column, until the $A_{280}$ was lower than 0.05. Bound proteins were eluted with a 25 ml gradient of 1.7 M to 0 M $(NH_4)_2SO_4$ in 20 mM Tris-HCl pH 7.5 (1 ml/min; fraction: 1 ml). The fractions in which the highest glucosyl transferase activity was present were combined and dialysed overnight against 25 mM Tris-HCl pH 7.5 and stored at 4° C.

The glucosyl transferase thus obtained has a maximum activity at a temperature of 75° C. and at pH 6.5. The molecular weight lies between 43 and 54 kDa and the enzyme is active as a monomer. The first 35 N terminal amino acids were determined. The sequence was determined as: MELPRAFGLL LHPTSLPGPY GVGVLGQEAR DFLRF (1 letter code).

EXAMPLE 2

Modification of Gelatinized Starch with a Thermostable Enzyme

Figure 1:
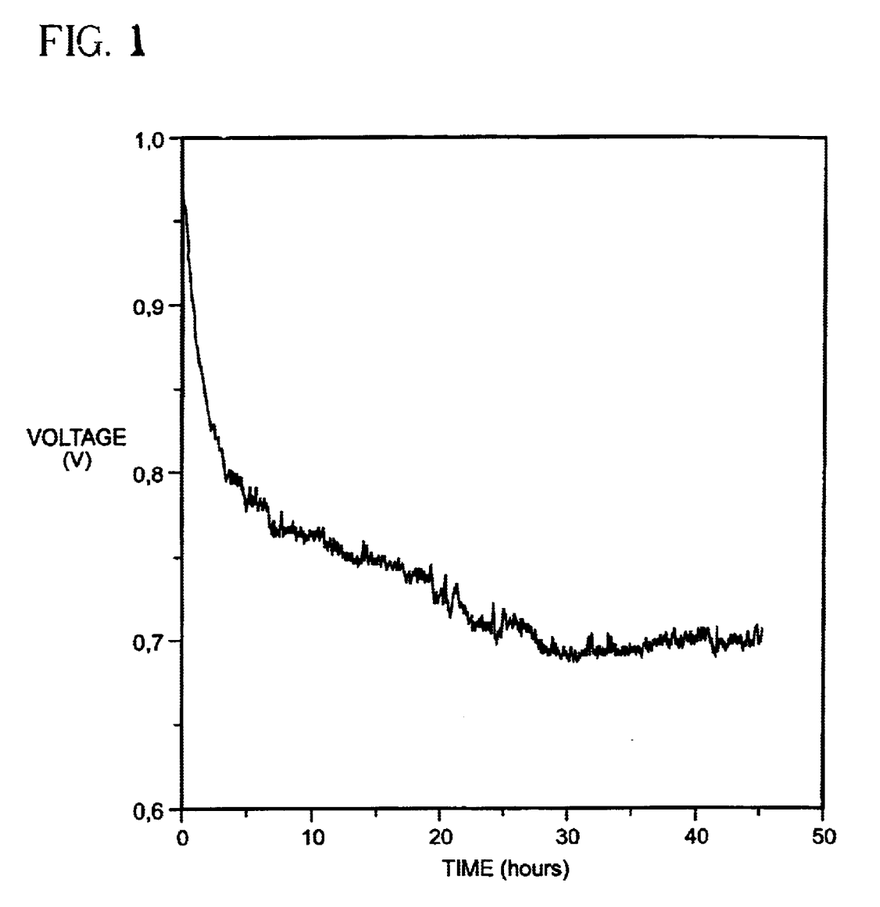

A suspension of potato starch (20 wt. % amylose; 80 wt. % amylopectin; this also applies to the following examples, unless otherwise indicated) in 50 mM sodium citrate pH 6.5 (10 wt. % dry substance) was gelatinized in a jet-cooker at 150° C. The resulting viscous suspension was cooled down to 70° C. and the pH was readjusted to 6.5. Subsequently, 1 mg of a purified glucosyl transferase as obtained in Example 1 was added to 8 l of the suspension. Then the solution was incubated for some hours, until the viscosity had reached a constant value (FIG. 1). The viscosity change was followed via registration of the voltage required to keep constant the number of revolutions of the stirring motor.

EXAMPLE 3

Modification of Gelatinized Starch with a Thermolabile Enzyme

Potato starch was gelatinized by incubating a 5% starch suspension for 10 min at 100° C. The resulting viscous suspension was cooled down to 30° C. and 40 µg potato D-enzyme were added to 5 ml of the suspension. The reaction mixture was incubated for 48 hours at 30° C.

EXAMPLE 4

Modification of Swollen Starch Granules with a Thermostable Enzyme

Figure 2A:
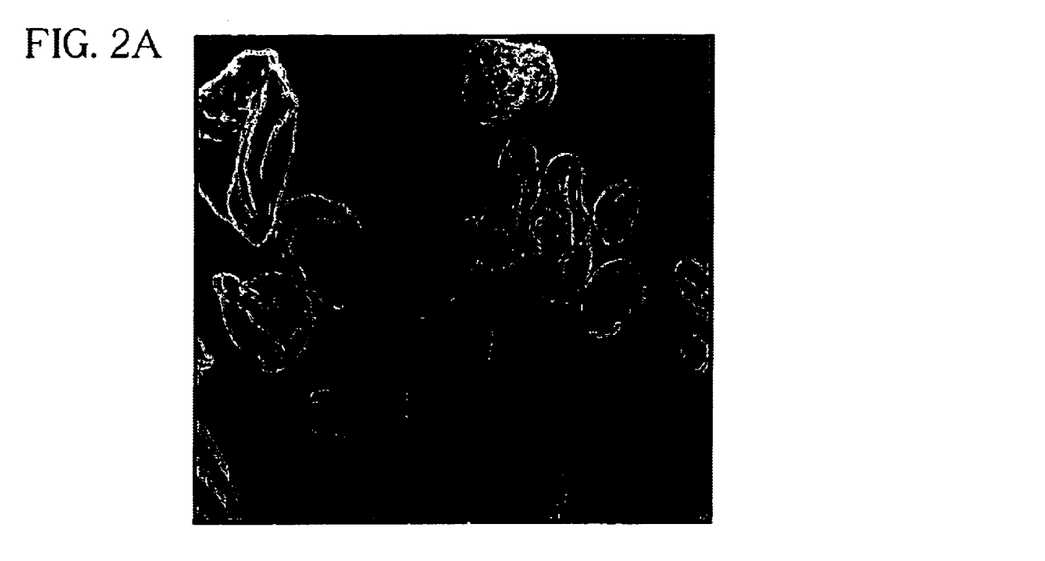
Figure 2B:
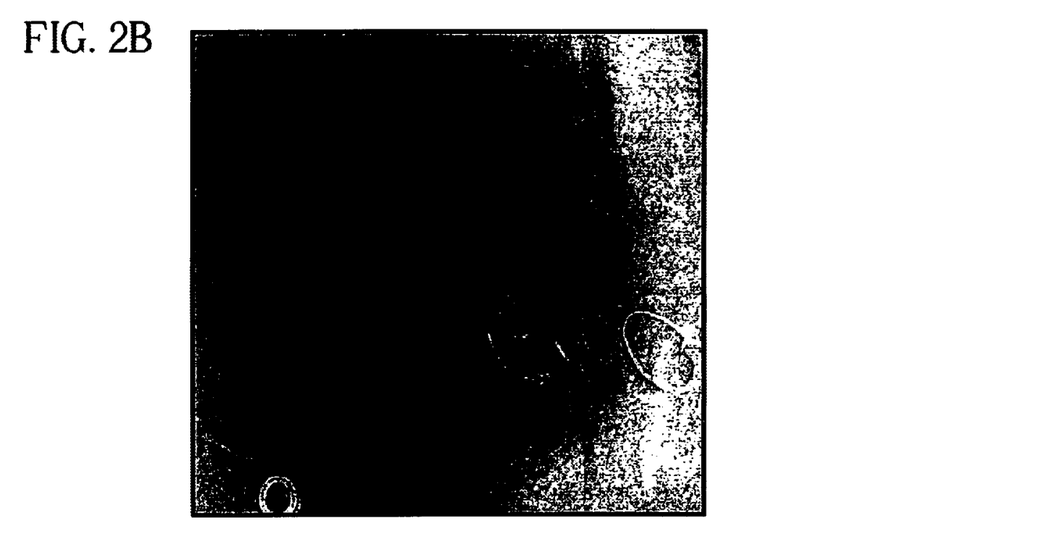

A 5% suspension of potato starch (5 ml) was mixed with 2 µg T. thermophilus glucosyl transferase from Example 1 and heated to 70° C., subsequent to which incubation was effected, until the viscosity was constant (ca. 24 hours). At 70° C. the granular structure of the swollen potato starch was excellently visible. After the action of the glucosyl transferase the granular structure had completely disappeared, while without glucosyl transferase the granular structure was still excellently visible (FIG. 2 is a phase-contrast photograph (200×) of potato starch (A) and glucosyl transferase modified potato starch (B) at 70° C.).

EXAMPLE 5

Characterization of the Starch Modified with Glucosyl Transferase

Some analyses were carried out at the modified starch from Examples 2, 3 and 4. As reference gelatinized (2%; 20 min; 120° C.) potato starch was taken.

Figure 3:
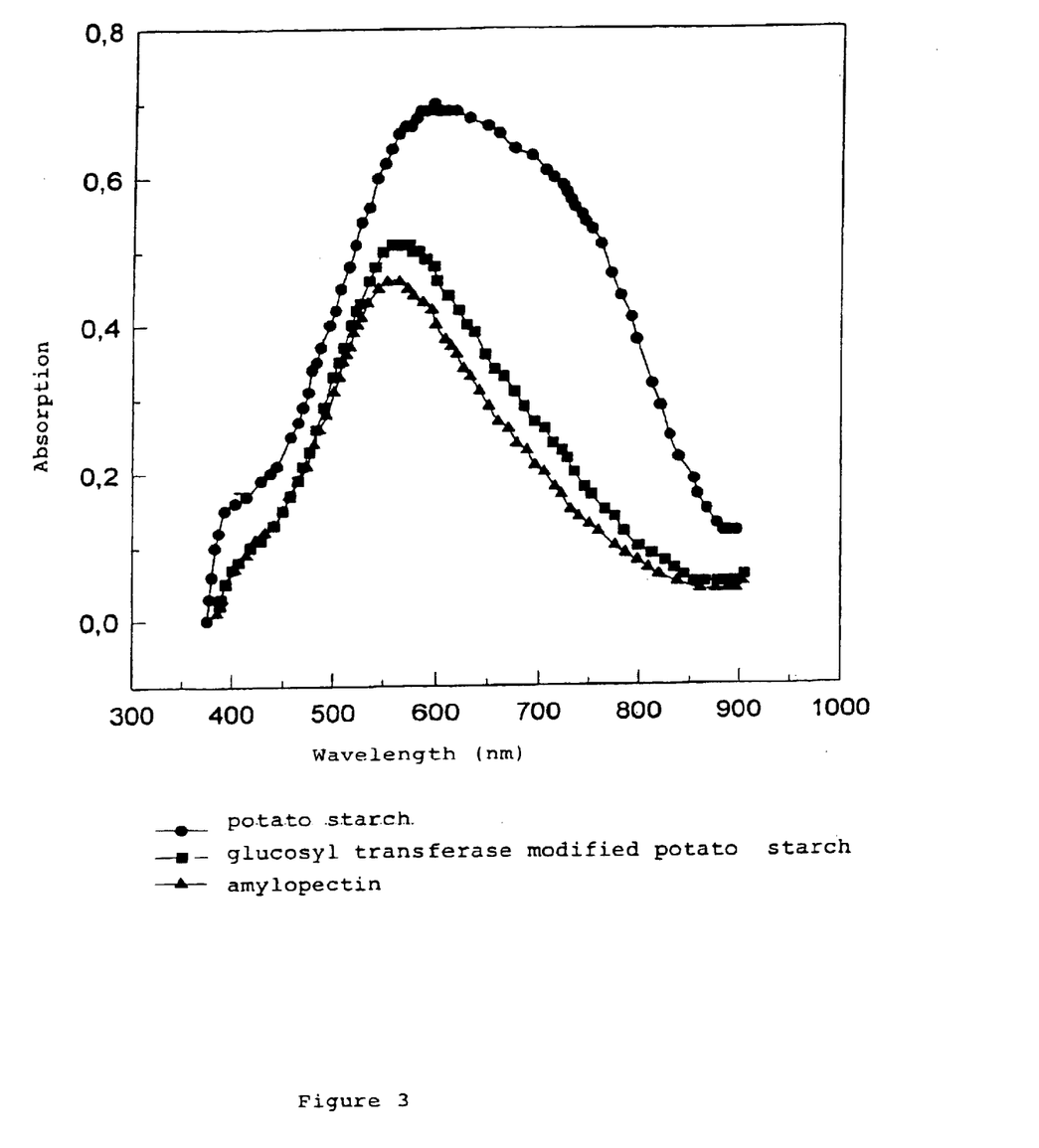

The iodine absorption spectra of the products formed in Examples 2, 3 and 4 were identical with each other, but with respect to the starting material (potato starch) the absorption maximum had shifted from 620 nm to 540 nm (FIG. 3). A comparison was also made with the iodine absorption spectrum of amylose-free potato starch (amylopectin).

Figure 4A:
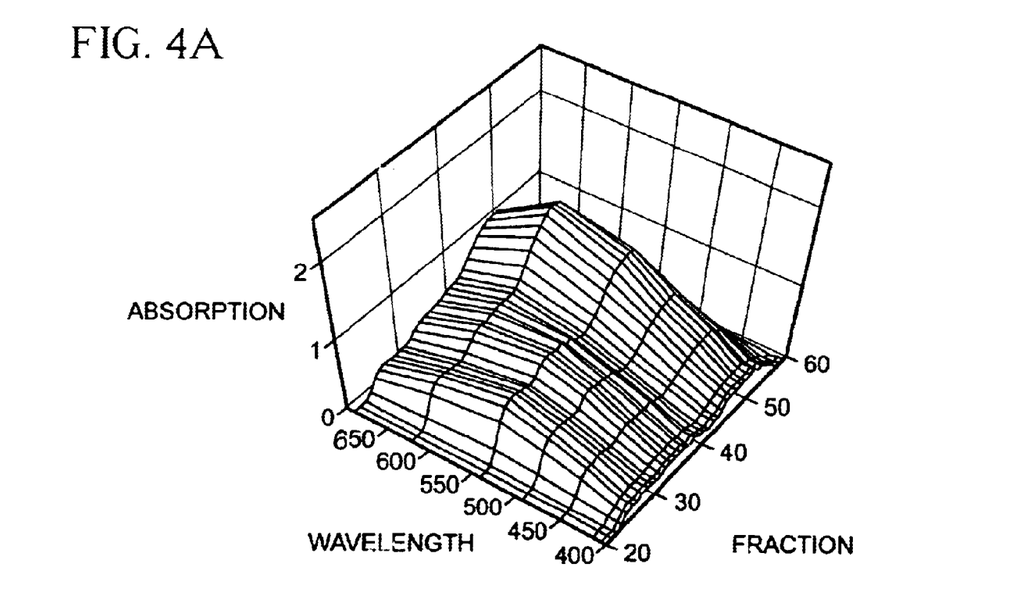
Figure 4B:
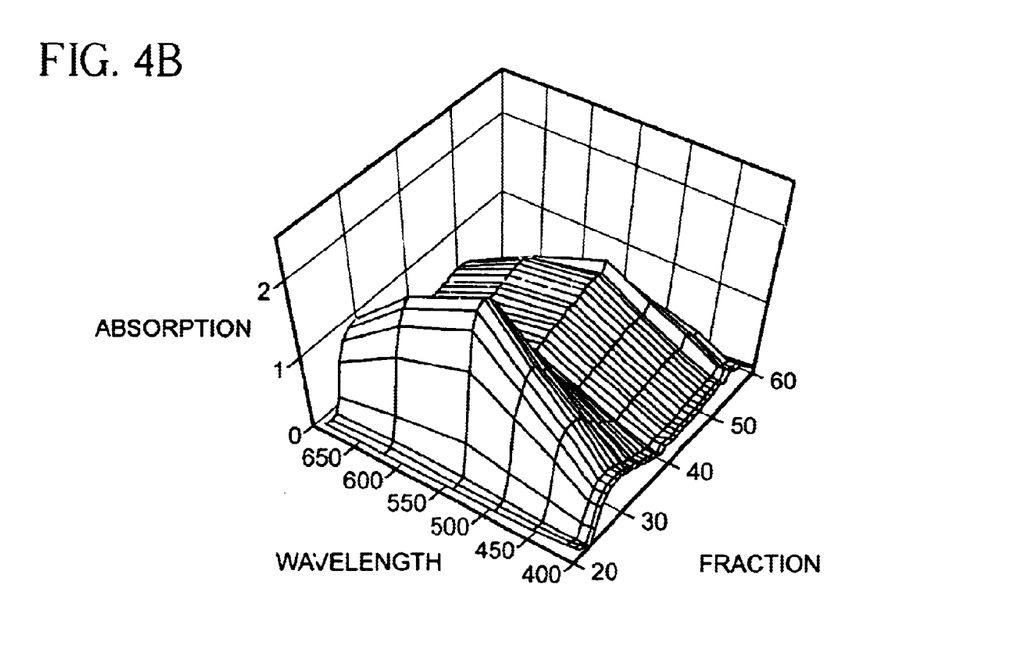

The molecular weight distribution of soluble potato starch modified with T. thermophilus glucosyl transferase from Example 1 (Merck), determined by means of gel filtration chromatography (Superdex 200) and iodine absorption spectrum (FIG. 4, Part B) had changed in relation to the starting material (FIG. 4, Part A). The presence of two peaks in Part B of FIG. 4 indicates that a conversion has taken place, while the modified product has maintained a great molecular weight.

Figure 5A:
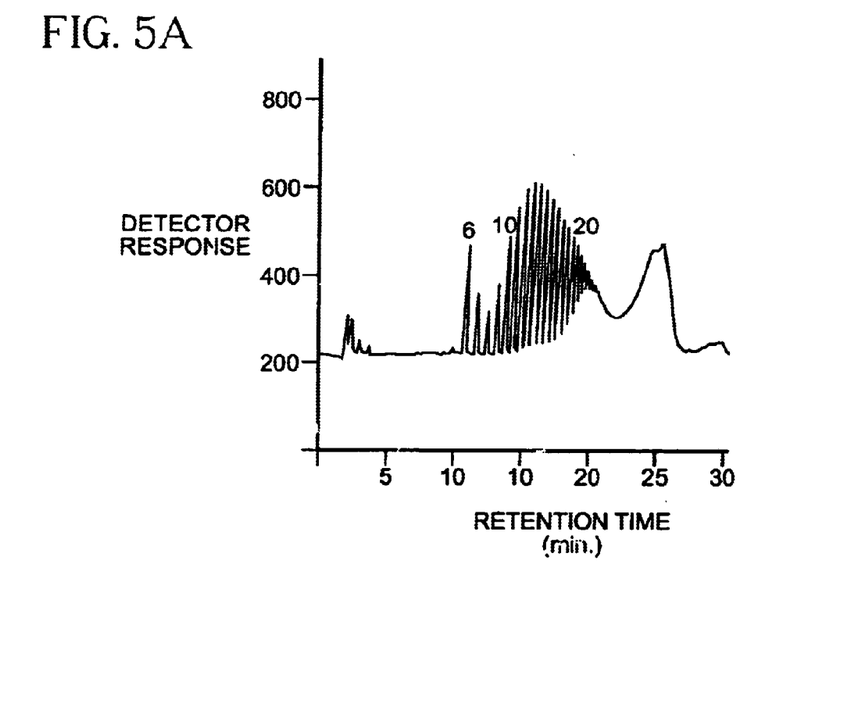
Figure 5B:
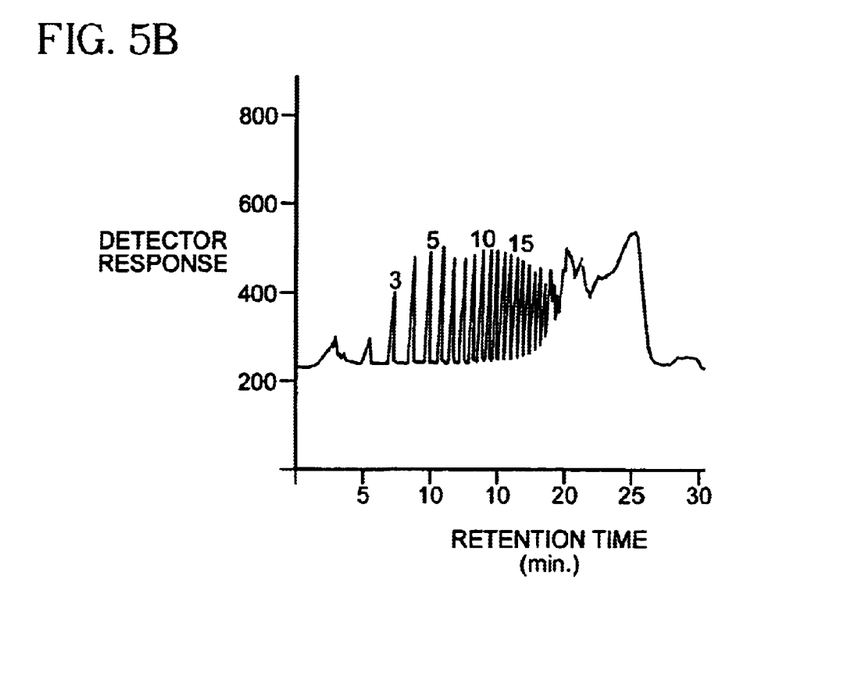
Figure 6:
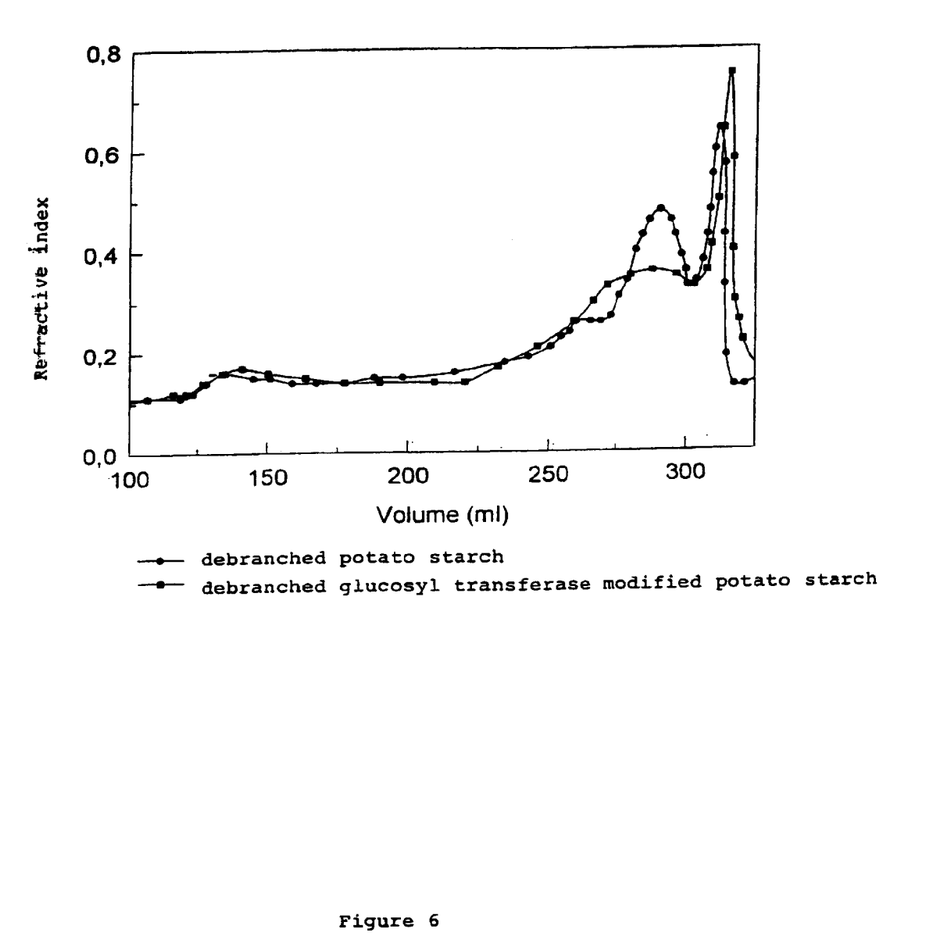

The branching percentage (the ratio between the number of α-1,6 bonds and the number of α-1,4 bonds determined by means of the enzyme isoamylase which breaks the α-1,6 bonds, so that an additional reducing group is formed; the increase in the number of reducing groups by the action of isoamylase is a measure for the number of α-1,6 bonds or branching points) and the reducing power had only slightly changed in relation to the starting material (branching percentage: 2.86% versus 2.77% for the starting material; reducing content: 0.00293 versus 0.00288 for the starting material). The side chain length distribution had indeed changed in relation to the starting material, as can be observed after debranching (FIGS. 5 and 6). FIG. 5 shows the elution profile of debranched potato starch (A) and debranched glucosyl transferase modified potato starch (B). The oligosaccharides were separated on a Dionex HPLC and detected by means of a Pulsed Amperometric Detector. The numbers above the peaks indicate the length of the oligosaccharides. FIG. 6 shows the elution pattern of debranched potato starch and debranched glucosyl transferase modified potato starch which was separated on a gel filtration column (Superdex 200).

EXAMPLE 6

Formation of a Gel

The solution obtained in Example 2 was cooled to 4° C. and further incubated, until a white gel had been formed. This material was successively washed with water and with 25%, 50%, 75% and 100% ethanol. The material thus obtained was dried in the air and ground to obtain a powder having an average size of ca. 200 µm. There were obtained ca. 500 g potato starch modified with glucosyl transferase.

EXAMPLE 7

Thermoreversibility and Formation of the Gel

Figure 7A:
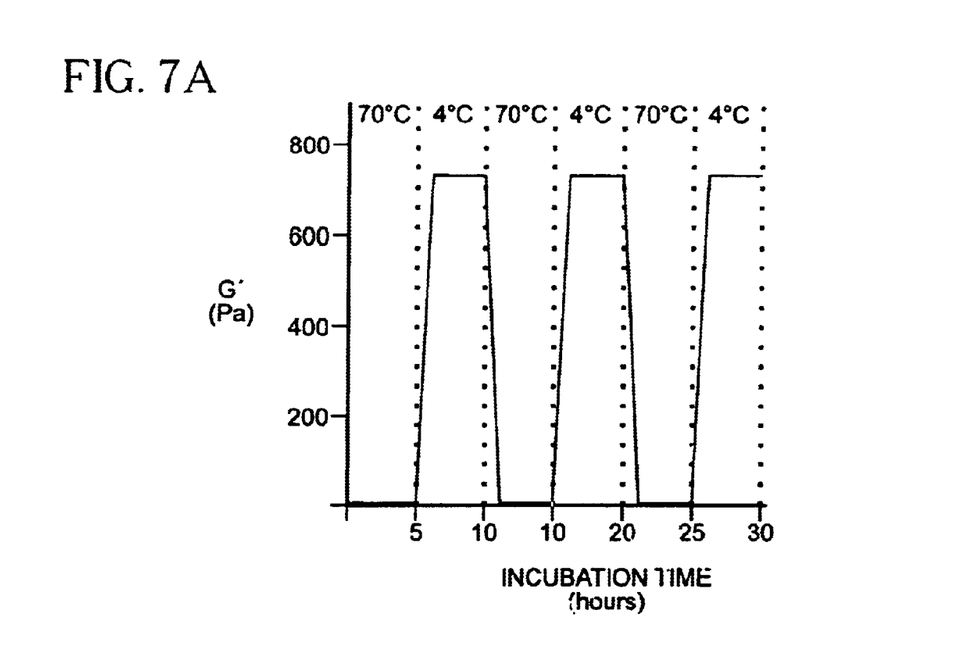
Figure 7B:
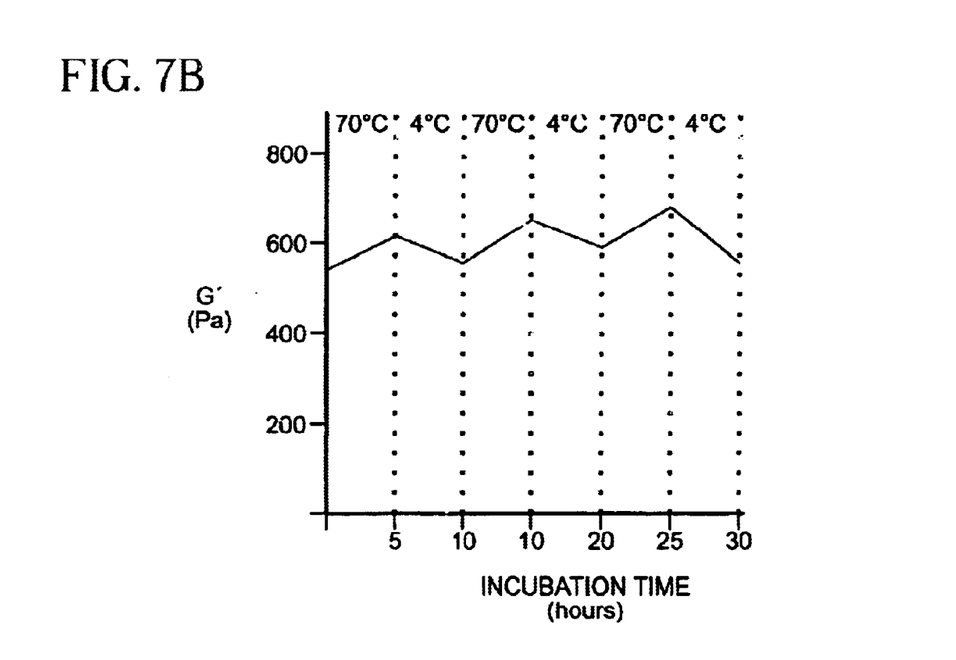

With material obtained according to Example 6 there was prepared a 5% aqueous suspension, which was heated at 90° C., until a clear solution was obtained. This solution was cooled in a rheometer to 4° C. and G' (G") was followed with time (for G' and G" see "Inleiding in de Reologie" 1991, ISBN 90 201 2557 5, pp. 177–189). After G' was constant, the temperature was increased to 70° C., and then cooling was effected again to 4° C. This process was repeated three times. As control a 3% potato starch solution was taken. FIG. 7 is a hypothetical representation of the established change in the viscosity (G') of glucosyl transferase modified potato starch (Part A) and of potato starch (Part B) after three cycles of heating and cooling. Part A clearly shows the behaviour of thermoreversible gel.

Figure 8:
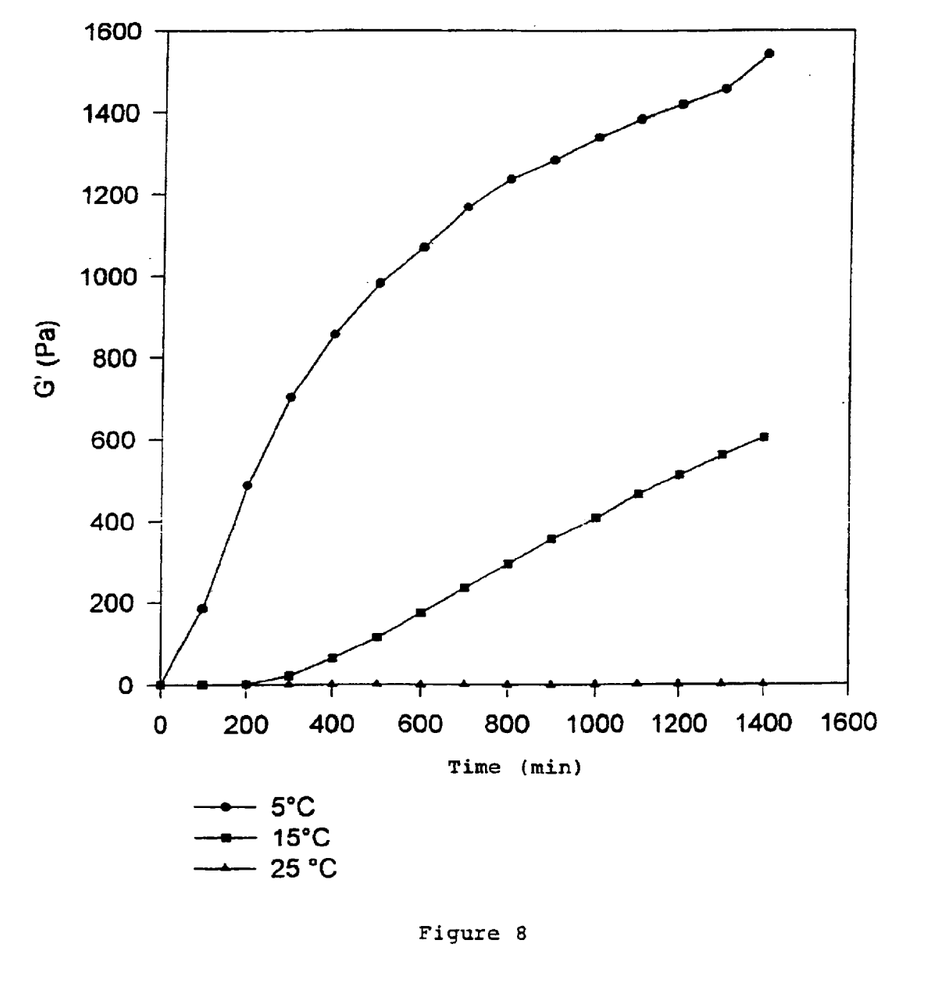

Starting from a 5% aqueous suspension as described in this example, the formation of the gel was examined, in which respect it was established that this occurs at rather low temperatures of 15° C. and less (FIG. 8, which shows the gel formation (increasing G') of glucosyl transferase modified potato starch at different temperatures).

What is claimed is:

1. A method of making modified starch comprising treating amylose-containing starch in aqueous medium with an enzyme selected from the group consisting of α-1,4-α-1,4-glucosyl transferases (EC 2.4.1.25) and an enzyme with an activity of said glucosyl transferases said activity being the capability of breaking an +-1,4 bond between two glucose units to subsequently make a second α-1,4 bond, whereby the polymeric properties of said amylose-containing starch are maintained, and wherein said modified starch is useful as an agent for forming a thermoreversible gel.

2. A method according to claim 1, wherein said enzyme is essentially free of enzymatic components which may cause damage to polymeric properties of said starch.

3. A method according to claim 1, wherein said amylose-containing starch is potato starch, maize starch, wheat starch, rice starch or tapioca starch.

4. A method according to claim 1, wherein said modified starch is present in a concentration of at least 3 wt. %.

* * * * *

UNITED STATES PATENT AND TRADEMARK OFFICE
CERTIFICATE OF CORRECTION

PATENT NO. : 6,864,063 B2
DATED : March 8, 2005
INVENTOR(S) : Euverink et al.

It is certified that error appears in the above-identified patent and that said Letters Patent is hereby corrected as shown below:

Column 7,
Line 7, now reads "an +-1,4 bond" should read -- an α-1,4 bond --

Signed and Sealed this

Twelfth Day of July, 2005

JON W. DUDAS
*Director of the United States Patent and Trademark Office*